United States Patent [19]

Ingersoll et al.

[11] Patent Number: 5,327,739
[45] Date of Patent: Jul. 12, 1994

[54] DESICCANT ADSORPTION AIR CONDITIONER FOR AUTOMOBILES

[75] Inventors: John G. Ingersoll, Topanga; Linda M. Maxwell, Redondo Beach, both of Calif.

[73] Assignee: Hughes Aircraft Company, Los Angeles, Calif.

[21] Appl. No.: 942,896

[22] Filed: Sep. 10, 1992

[51] Int. Cl.[5] .................... F23L 15/02; F25D 17/06
[52] U.S. Cl. .......................... 62/78; 62/93; 62/324.2; 62/239
[58] Field of Search .......... 62/271, 78, 92, 93, 62/94, 304, 307, 239, 324.2; 165/3

[56] References Cited

U.S. PATENT DOCUMENTS

| | | | |
|---|---|---|---|
| 1,919,781 | 7/1933 | Forrest et al. | 62/271 |
| 2,075,036 | 3/1937 | Hollis | 62/309 |
| 2,477,021 | 7/1949 | Vingoe | 62/78 |
| 4,060,916 | 12/1977 | Yoshida et al. | 34/80 |
| 4,113,004 | 9/1978 | Rush et al. | 165/3 |
| 4,380,910 | 4/1983 | Hood et al. | 62/91 |
| 4,574,874 | 3/1986 | Duran | 165/43 |
| 5,022,241 | 6/1991 | Wilkinson | 62/271 |

Primary Examiner—Henry A. Bennet
Assistant Examiner—William C. Doerrler
Attorney, Agent, or Firm—M. E. Lachman; M. W. Sales; W. K. Denson-Low

[57] ABSTRACT

A desiccant air conditioning system (10) is provided for a passenger compartment (28) of a vehicle. Ambient air, to be eventually conditioned, passes through desiccant material maintained in a desiccant chamber (14) where it loses a portion of its moisture content while its temperature rises because of the release of the heat of vapor condensation. Subsequently, this hot, dry air is passed through a heat exchanger (20) where it is cooled down to a temperature close to the ambient. This very dry, cool air is then humidified by a humidifier (24), becoming cool, moist air, that is introduced into the passenger compartment of the vehicle. Exhaust air (30) from the passenger compartment is further humidified by a humidifier (32), so as to cool it. This cooled, humidified air is then passed through the heat exchanger (20) to cool the hot, dry incoming air. The air conditioning system may also be used in a heating mode by simply deactivating the heat exchanger (20) and the two humidifiers (24 and 32) and using the exhaust air from the passenger compartment as the source of the air (42) incoming into the desiccant chamber. The desiccant material can be regenerated by means (40), such as by passing current therethrough, to drive off absorbed water.

18 Claims, 3 Drawing Sheets

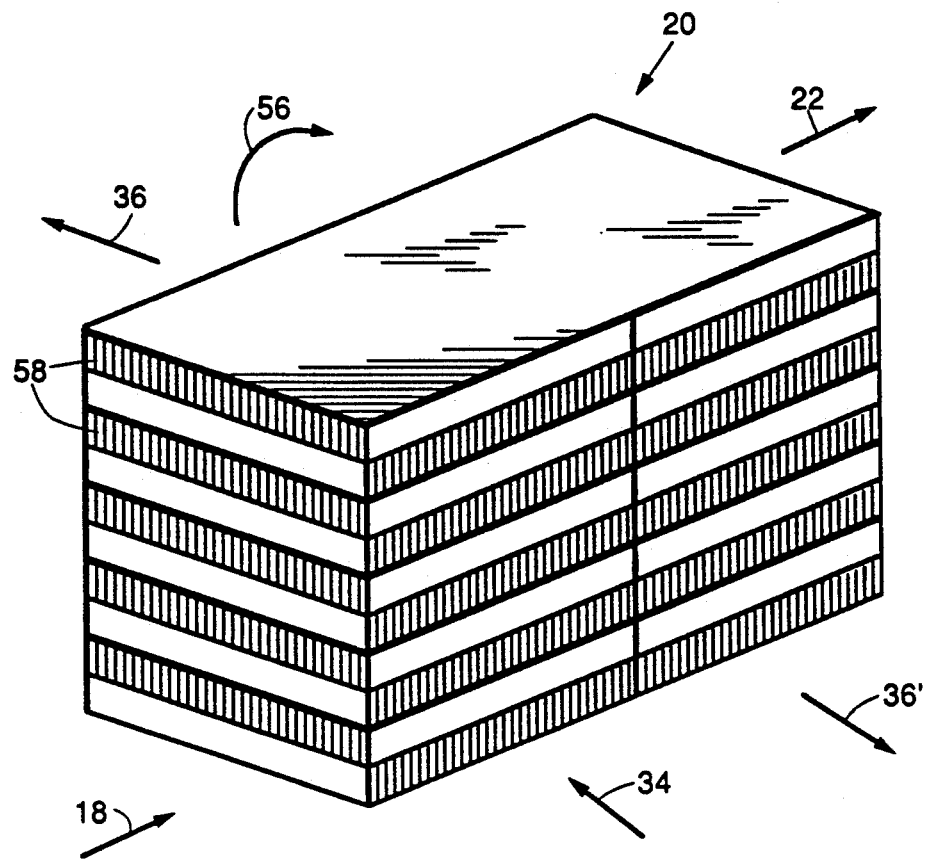
FIG. 4.
FIG. 5.
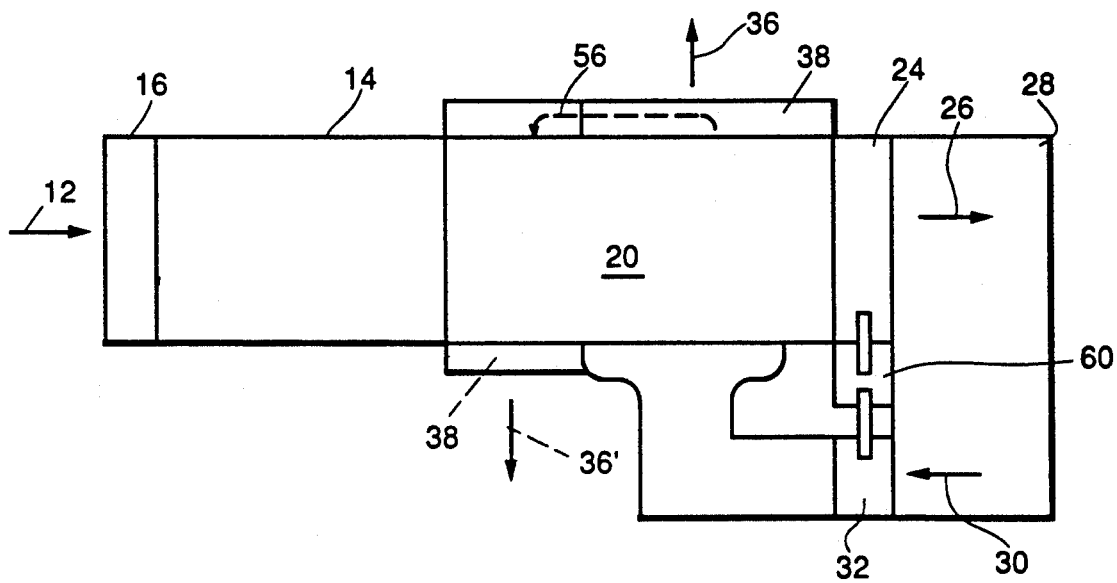

DESICCANT ADSORPTION AIR CONDITIONER FOR AUTOMOBILES

BACKGROUND OF THE INVENTION

1. Field of the Invention

The present invention relates generally to air conditioners, and, more particularly, to automotive air conditioners, especially useful for electric vehicles.

2. Description of Related Art

The advent of an international agreement limiting production of certain refrigerants because of their detrimental effect on the atmosphere, particularly the depletion of the ozone stratospheric layer, has caused a sudden and intense concern in the refrigeration and air conditioning industry. As is well-known, the Montreal Protocol has been signed by 24 nations, including the United States, and efforts are going forward to put its provisions into effect. The signatory nations in the Montreal Protocol have agreed that chlorofluorocarbons (CFCs) will be strictly controlled and that all production will cease in 1995. The Environmental Protection Agency (EPA) has released a massive collection of rules and regulations that will be used to enforce cuts in the production and use of these refrigerants. During the second half of 1992, the EPA can begin enforcing these laws outlined in the 1990 U.S. Clean Air Act. Earlier this year, the U.S. administration implemented an accelerated phase-out schedule. According to the EPA rules, the sale of CFCs to the public becomes illegal. It is also illegal for anybody, including service persons, to vent CFCs in the air. Moreover, the law requires the collection and recycling of all the refrigerants in automotive applications. Anyone servicing an air conditioner must be EPA-certified and must use approved recovery and recycling equipment.

The refrigerants in question are the chlorofluorocarbons (CFCs) 11, 12, 113, 114, and 115. Of these, the banning of CFC-12 is of the utmost concern, as it is used in refrigerators, freezers, automobile air-conditioners, refrigerated vending machines, food display cases, and a variety of small home and business appliances. Moreover, of the aforementioned uses of CFC-12, the automobile air-conditioner one is the most critical use, as it comprises the largest inventory of the refrigerant as well as it offers the highest likelihood of escape to the environment.

In the past few years the hydrofluorocarbon (HFC) 134a has been promoted as a substitute for CFC-12 in automobile air-conditioners. However, HFC-134a is not a drop-in replacement for CFC-12. The thermophysical properties of HFC-134a are such that it requires a bigger compressor, heavier fluid lines, and is not as efficient as CFC-12(fuel requirements are calculated to be 4% higher using HFC-134a compared to that of CFC-12). In addition, performance comparisons in vehicles between CFC-12 and HFC-134a show that the passenger compartment temperature is 1° to 2° F. (0.56° to 1.1° C.) higher at normal vehicle speed, and 4° to 6° F. (2.2° to 3.3° C.) higher at idle when HFC-134a is used.

It is therefore prudent to investigate other refrigeration alternatives, particularly with regard to automotive air-conditioning uses.

However, while there is a concern regarding the banning of CFCs, it will also be recognized that there are numerous applications where a potentially more energy efficient system may be desirable or necessary than the traditional vapor compression cycle, whether it makes use of CFC-12 or HFC-134a. Such is the case, for example, in an electric vehicle where a traditional air-conditioner draws significant amounts of power that reduce critically the in-between charging range of the vehicle. Electric vehicles, of course, are also becoming highly desirable because of reduced emissions of carbon dioxide and several air pollutants.

Thus, increased efficiency becomes a very important driving force regarding the development of alternative automotive air-conditioning systems.

SUMMARY OF THE INVENTION

In accordance with the invention, there is provided a desiccant adsorption air conditioning system for conditioning the air of a passenger compartment of a vehicle which comprises:

(a) a desiccant chamber containing a quantity of a desiccant material;

(b) means for introducing air into the desiccant chamber to produce air having reduced humidity;

(c) means for passing the exhaust dry air from the desiccant chamber to a heat exchanger to thereby cool the air;

(d) means for passing the cooled air to a first humidifier to increase the humidity of the cooled air;

(e) means for passing the cooled, moist air into the passenger compartment;

(f) means for exhausting air from the passenger compartment to a second humidifier to increase the humidity of the exhausted air; and (g) means for passing the exhausted air having increased humidity to the heat exchanger to aid in cooling the air having reduced humidity. The air introduced into the desiccant chamber may be outside ambient air or recirculated from the passenger compartment.

The system also includes means for heating air in a closed circulating system by turning off the humidifiers and the heat exchanger and feeding the exhausted air from the passenger compartment to the desiccant.

The air conditioning system of the invention is especially adaptable for electric vehicles.

BRIEF DESCRIPTION OF THE DRAWINGS

FIG. 4 is a perspective view of a cross-flow heat exchanger used with the air conditioning system depicted in FIG. 1; and FIG. 5 depicts the component lay-out of the air conditioning system shown in FIG. 1.

DESCRIPTION OF THE PREFERRED EMBODIMENTS

Extensive effort has been devoted to the development of desiccant air-conditioner systems for the air conditioning of buildings utilizing low temperature solar heat to recondition the desiccant. However, to the inventors knowledge, no prior attempts have been made in designing and/or fabricating a desiccant air-conditioner system for automotive applications. Further, due to the limited space available in a vehicle and the power required for regeneration of the desiccant, the teachings from desiccant air-conditioner systems for use with buildings cannot simply be extended to automotive applications.

The success of the development of an effective desiccant air-conditioner system to replace a vapor cycle air-conditioner system is predicated on the ability to be able to reduce or shift the cooling load of the passenger compartment of an automobile. Thus, improved efficiency in cooling the vehicle is of paramount importance, as it would result in a physically smaller refrigeration system that can be accommodated within the space constraints of an automobile. In this regard, use of the desiccant air-conditioner system in an electric car appears to be even more feasible than in a gasoline car, although the invention is not so limited, for in the former case, additional heat exchangers required to recondition the desiccant material are eliminated. Based on passenger air-conditioner usage, on the other hand, enough desiccant material can be stored on-board an electric car to provide cooling between successive battery charges, at which point the desiccant material itself is also reconditioned.

Figure 1:
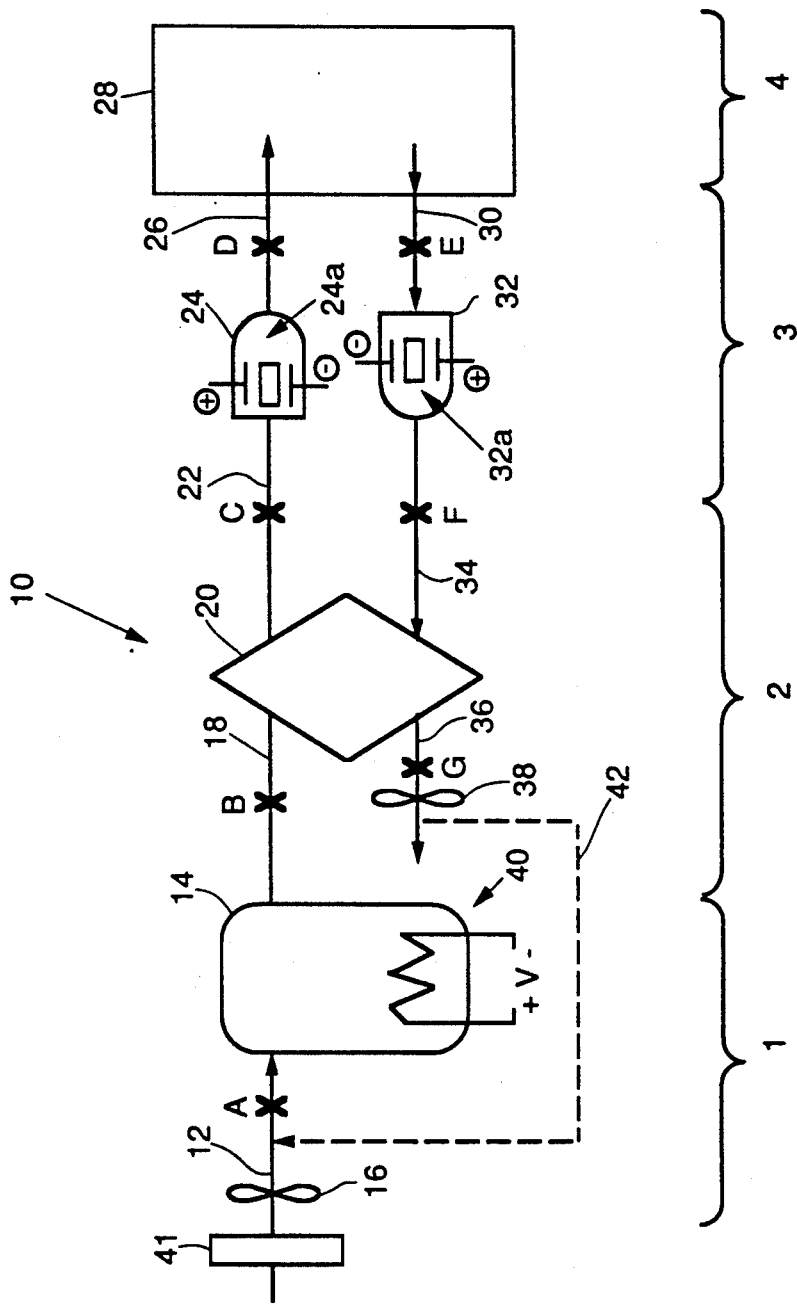
FIG. 1 is a schematic diagram of a desiccant adsorption cycle air conditioning system, illustrating the major components of the system.

The essential elements of the desiccant system 10 of the invention are schematically depicted in FIG. 1. The system 10 comprises four parts or zones: (1) an ambient air dehumidification; (2) a hot, dry air cool-down to near ambient; (3) a cool, dry air rehumidification; and (4) conditioned air.

In the first zone, ambient air is dehumidified by introducing air along path 12 into a desiccant chamber 14 by means such as a fan 16. The desiccant chamber 14 contains a quantity of a desiccant material. As the ambient air passes through the desiccant material, it loses a portion of its moisture content while its temperature rises because of the release of the heat of vapor condensation. Hot, dry air then exits the desiccant chamber 14 in line 18. In the second zone, the hot, dry air is cooled down to near ambient by passing the hot, dry air in line 18 through a heat exchanger 20. Next, the cooled, dry air, which exits the heat exchanger in line 22, is passed into the third zone, where it is humidified by a humidifier 24. The cooled, humidified air, which exits the humidifier in line 26, is now properly conditioned and is passed into the fourth zone, the passenger compartment 28.

In the return cycle, exhaust air exits from the passenger compartment 28 in line 30, and is humidified by humidifier 32. The humidified exhausted air is passed in line 34 through the heat exchanger 20, where it serves to cool the incoming hot, dry air from line 18. The exhausted air then passes from the heat exchanger 20 along line 36, aided by a fan 38.

In the desiccant chamber 14, which contains a desiccant material that easily absorbs water from the air, means 40 is provided to regenerate the desiccant. Such means may comprise a resistance heater, for example, or a vacuum. In either event, water that is absorbed by the desiccant is removed, thereby regenerating the desiccant.

In an optional embodiment, a filter 41 for removing pollutants from the ambient air may be placed in front of the desiccant chamber 14. This prevents fouling of the desiccant material by environmental pollutants. An example of a filter suitably employed in the practice of the invention is a carbon filter that is readily replaceable.

Sensors may be used, as indicated by the designation "X" and the letters associated therewith. In some cases, dry bulb only sensors are employed, which give the temperature of the air at that point. In other cases, dry bulb/wet bulb sensors may be employed, which give both the temperature and the relative humidity (rh) of the air at that point.

Table I below lists representative data for system 10 in the cooling mode. It will be recognized by those skilled in the art that improved results, i.e., lower exit air temperature, can be obtained by optimizing the system components for this specific application.

TABLE I

Representative Performance Data for Cooling Mode (Refer to FIG. 1)

| Location | Temperature | Humidity |
|---|---|---|
| A | 100.6° F. (38.1° C.) | 25% rh |
| B | 109.1° F. (42.8° C.) | |
| C | 80.8° F. (27.1° C.) | 33% rh |
| D | 71.8° F. (22.1° C.) | 63% rh |
| E | 80.6° F. (27.0° C.) | 53% rh |
| F | 69.4° F. (20.8° C.) | |
| G | 98.4° F. (36.9° C.) | |

The desiccant adsorption air conditioning system may be used in a heating mode by turning off the heat exchanger 20 and humidifiers 24 and 32 and passing the air straight through the system. The air from the passenger compartment 28 is subsequently introduced into the desiccant chamber 14 by line 42. Thus, only recirculated air is used in the heating mode.

Table III below lists representative data for system 10 in the heating mode.

TABLE II

Representative Performance Data for Heating Mode (Refer to FIG. 1)

| Location | Temperature | Humidity |
|---|---|---|
| A | 63.2° F. (17.3° C.) | 64% rh |
| C | 73.2° F. (23.4° C.) | 33% rh |

Desiccant Material

Figure 2:
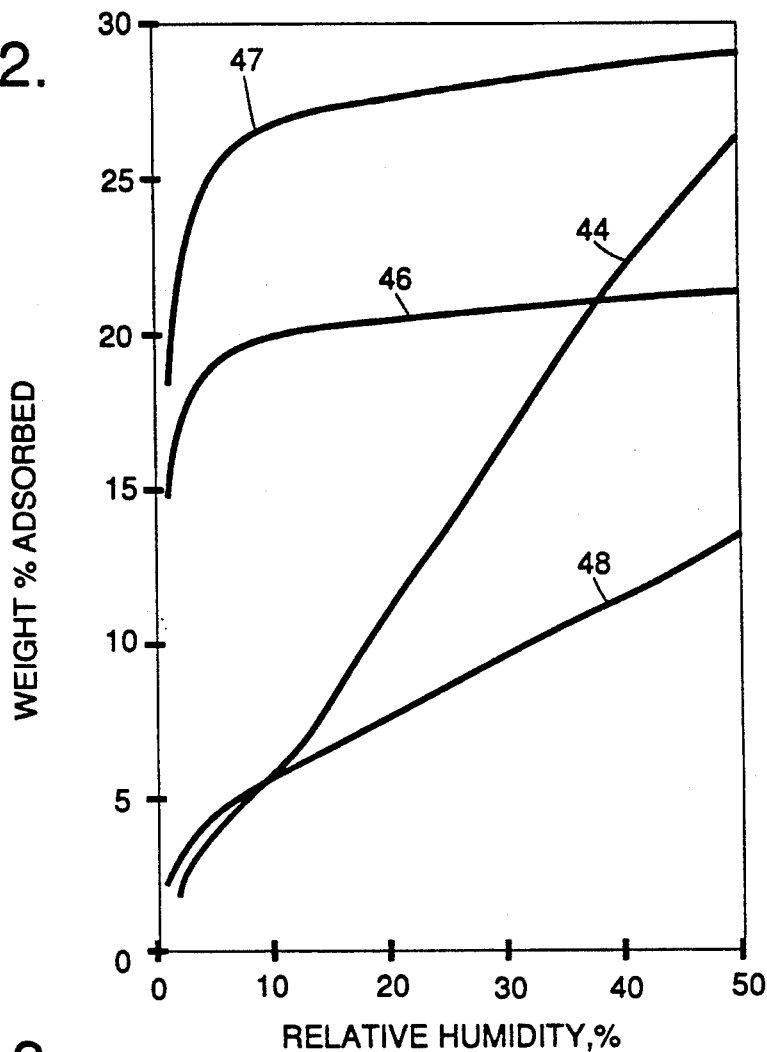
FIG. 2, on coordinates of weight percent adsorbed and percent relative humidity, are plots of equilibrium water loadings for several adsorbents as a function of relative humidity.

The desiccant material used in the invention may be any of the desiccants, such as a zeolite molecular sieve, for example, Type 13X or Type 5A, available from Union Carbide, Linde Division, activated alumina, silica, or lithium chloride. The moisture absorption characteristics of the materials are shown in FIG. 2. It will be noted that silica gel (Curve 44) is initially better in terms of moisture absorption for high relative humidity climates. The molecular sieves (Type 5A, Curve 46 and Type 13X, Curve 47) operate at a fairly constant adsorption rate independent of relative humidity, with Type 13X absorbing more moisture as a function of weight than Type 5A. Activated alumina (Curve 48) is included for comparison.

Preferably, a molecular sieve is employed as the desiccant material. While Type 5A may be regenerated at a lower temperature than Type 13X, the latter is a more efficient absorber of water, and accordingly is most preferred.

The selected amount of desiccant material in the desiccant chamber 14 for the electric car design is about 4 kg per vehicle. The total amount of moisture this desiccant can retain is approximately 1.0 kg. Assuming the American Refrigeration Institute (ARI) condition as the operating ambient humidity ratio and assuming a reduction in humidity ratio of the exit air of 0.003 kg moisture per kg of dry air, then the amount of moisture retained in the desiccant may be easily calculated to be 0.6 kg/hr of continuous operation at 100 cfm air flow. Thus, the 4 kg of desiccant will be able to condition the outside air for a period of about 2 hours, which is deemed adequate for the electric car whose driving range between battery charging is on the order of 60 miles. The saturated 4 kg of desiccant are reconditioned while the batteries are recharged. The time of reconditioning is approximately the same as the time of moisture adsorption, i.e., no more than two hours. Reconditioning is accomplished by means 40, described above.

Figure 3:
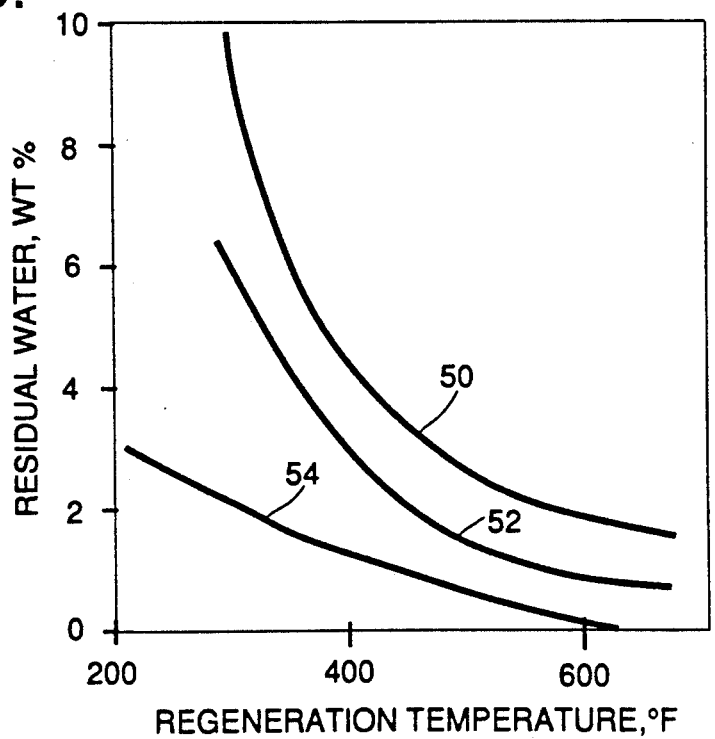
FIG. 3, on coordinates of residual water in weight percent and regeneration temperature in ° F., are plots depicting the effect of regeneration temperature and water content of the purge air on residual water content of a molecular sieve adsorbent.

A reconditioning curve for molecular sieves is shown in FIG. 3. The curves represent the amount of residual water as a function of regeneration temperature for different temperatures of the purge gas: 80° F. (26.7° C.) (dew point) (Curve 50); 35° F. (1.67° C.) (Curve 52); and −40° F. (−40° C.) (Curve 54). It will be appreciated that it is virtually impossible to totally drive out the moisture from a desiccant material without destroying the material itself.

The life expectancy of desiccant materials is typically several thousand cycles if they are maintained properly. The desiccant chamber 14 advantageously comprises a rotating drum approximately 0.15 meter in diameter and 0.35 meter in length. In one embodiment, the drum includes a shaft that runs along the axis thereof, which is attached to a drive system requiring a small motor with adjustable speed.

Heat Exchanger

The selected heat exchanger 20, shown in FIG 4, is a compact cross-flow type. An efficient heat exchanger is very critical for the successful operation of the desiccant air-conditioner system 10. In particular, the temperature of the dry air must be lowered to be as close as possible to that of the heat sink. In the pure desiccant air-conditioning system, the heat sink temperature must be capable of being further reduced. This is accomplished by humidifying to saturation exhaust air 30 from the passenger compartment 28 so as to further reduce its humidity, employing the second humidifier 32.

The heat exchanger 20 may comprise a single-pass, cross-flow device. Alternatively, the heat exchanger 20 may comprise a double-pass, cross-flow device, where air along line 34 enters the first stage of the device and then is circulated through the second stage of the device, as shown by arrow 56, to exit on line 36'.

In the single-pass, cross-flow heat exchanger 20, the dimensions in one embodiment were 0.35 meter in width, 0.13 meter in height, and 0.25 meter in length. The heat exchanger 20 consists of plain fin stock 58 with a 0.8 inch (2.03 cm) height and a spacing of 9 fins per inch. The material of the heat exchanger is aluminum.

Humidifiers

Two humidifiers 24, 32 are employed in the present design. Water is provided to both humidifiers by a source 60 (reference is made to FIG. 5).

The second humidifier 32 is used to reduce the temperature of the air serving as the heat sink for the hot, dry air going through the heat exchanger 20. The first humidifier 24 brings down the temperature of the air prior to its entering the passenger compartment 28.

It should be noted that proper temperature, humidity sensors (not shown) have to be introduced at the humidifiers to control water flow to the filters through which air passes to get humidified. These sensors will operate in conjunction with other sensors in the passenger compartment that determine the required air flow, inlet air temperature, and relative humidity so as to keep the vehicle occupants comfortable under the prevailing weather conditions.

Ultrasonic means is used to vaporize water in the humidifiers 24, 32. The ultrasonic means preferably comprises at least one piezoelectric crystal and driver assembly 24a, 32a, operated at a frequency sufficient to vaporize water, for example, on the order of several MHz. Piezoelectric crystals are energy efficient and saturate the air with water, compared with other, less energy efficient humidifying means, which often do not saturate the air with water. Ultrasonic humidifiers for this purpose are based on the same principles as known ultrasonic humidifiers, and thus need not be shown in detail.

The physical lay-out of the desiccant system in a block diagram, as it may be used in the electric vehicle, is shown in FIG. 5.

Thus, there has been disclosed a desiccant adsorption air conditioning system and method for conditioning the air of a passenger compartment of a vehicle. It will be appreciated by those skilled in the art that various modifications and changes of an obvious nature may be made without departing from the scope of the invention, and all such modifications and changes are intended to fall within the scope of the invention, as defined by the appended claims.

What is claimed is:

1. A desiccant adsorption air conditioning system for conditioning the air of a passenger compartment of a vehicle, comprising:
    (a) a desiccant chamber containing a quantity of desiccant material for absorbing water;
    (b) means for introducing air into said desiccant chamber to produce air having reduced humidity;
    (c) means for passing said air having said reduction humidity from said desiccant chamber to a stationary, cross-flow heat exchanger to thereby cool said air;
    (d) means for passing said cooled air to a first humidifier provided with water to increase the humidity of said cooled air to a controllable level, said first humidifier including an ultrasonic element to vaporize said water;
    (e) means for passing said cooled air having increased humidity into said passenger compartment;
    (f) means for exhausting air from said passenger compartment to a second humidifier provided with water to increase the humidity of said exhausted air to saturation, said second humidifier including an ultrasonic element to vaporize said water;
    (g) means for passing said exhausted air having increased humidity to said heat exchanger to aid in cooling said air having reduced humidity; and
    (h) means for reconditioning said desiccant material to desorb any absorbed water, said means separate from said exhausted air exiting from said passenger compartment.

2. The system of claim 1 wherein means are provided for bypassing said heat exchanger and said first and second humidifiers and for introducing said exhausted air from said passenger compartment to said desiccant chamber to thereby heat said air entering said passenger compartment.

3. The system of claim 1 wherein said desiccant is selected from the group consisting of molecular sieves, activated alumina, silica gel, and lithium chloride.

4. The system of claim 3 wherein said desiccant consists essentially of molecular sieve 13X or molecular sieve 5A.

5. The system of claim 1 further including means for removing pollutants from the ambient air prior to introducing said air into said desiccant chamber.

6. The system of claim 5 wherein said means for removing pollutants comprises a charcoal filter.

7. The system of claim 7 wherein said ultrasonic means comprise at least one piezoelectric crystal and means for vibrating said at least one piezoelectric crystal at a frequency sufficient to vaporize said water.

8. The system of claim 9 wherein said reconditioning means comprises a resistance heater for heating said desiccant material and driving off absorbed water.

9. A method for conditioning air entering a passenger compartment of a vehicle comprising:
(a) introducing air into a desiccant chamber containing a quantity of a desiccant material to absorb water in said air and thereby provide air having reduced humidity;
(b) passing said air having said reduced humidity from said desiccant chamber to a stationary, cross-flow heat exchanger to thereby cool said air;
(c) passing said cooled air to a first humidifier provided with water to increase the humidity of said air to a controllable level, said first humidifier including an ultrasonic element to vaporize said water;
(d) passing said cooled air having increased humidity into said passenger compartment;
(e) exhausting air from said passenger compartment to a second humidifier provided with water to increase the humidity of said exhausted air to saturation, said second humidifier including an ultrasonic element to vaporize said water;
(f) passing said exhausted air having increased humidity to said heat exchanger to aid in cooling said air having reduced humidity; and
(h) reconditioning said desiccant material to desorb any absorbed water by means separate from said exhausted air exiting from said passenger compartment.

10. The method of claim 9 wherein said air is introduced directly from said desiccant chamber into said passenger compartment and wherein said exhausted air from said passenger compartment is introduced to said desiccant chamber to thereby heat said air entering said passenger compartment.

11. The method of claim 9 wherein said desiccant is selected from the group consisting of molecular sieves, activated alumina, silica gel, and lithium chloride.

12. The method of claim 11 wherein said desiccant consists essentially of molecular sieve 13X or molecular sieve 5A.

13. The method of claim 9 wherein pollutants are removed from the ambient air prior to introducing said air into said desiccant chamber.

14. The method of claim 13 wherein said pollutants are removed by passing ambient air through a charcoal filter.

15. The method of claim 9 wherein said water is vaporized by at least one vibrating piezoelectric crystal.

16. The method of claim 9 wherein said desiccant material is reconditioned by passing a current therethrough to heat said desiccant material and thereby drive off absorbed water.

17. The system of claim 1 wherein said vehicle is an electric vehicle.

18. The method of claim 9 wherein said vehicle is an electric vehicle.

* * * * *